United States Patent [19]

Irvin

[11] 4,408,039

[45] Oct. 4, 1983

[54] SEPARATION OF POLYMER OF CONJUGATED DIENE FROM A SOLUTION POLYMERIZATION SOLVENT USING PRESTRIPPING STEP

[75] Inventor: Howard B. Irvin, Bartlesville, Okla.

[73] Assignee: Phillips Petroleum Company, Bartlesville, Okla.

[21] Appl. No.: 297,451

[22] Filed: Aug. 28, 1981

[51] Int. Cl.³ .............................................. C08F 6/10
[52] U.S. Cl. .................................. 528/500; 528/483
[58] Field of Search ............................... 528/500, 483

[56] References Cited

U.S. PATENT DOCUMENTS

| | | | |
|---|---|---|---|
| 2,235,127 | 3/1941 | Tyson | 260/94 |
| 2,940,960 | 6/1960 | Tegge | 528/486 |
| 2,943,082 | 6/1960 | Cottle | 528/501 |
| 3,190,867 | 6/1965 | Oldweiler et al. | 260/93.7 |
| 3,190,868 | 6/1965 | Mitacek | 528/486 |
| 3,198,777 | 8/1965 | Van Den Berg | 528/496 |
| 3,326,781 | 6/1967 | Wilson, Jr. | 528/500 |
| 3,527,741 | 9/1970 | Hattori | 528/500 |
| 3,583,967 | 6/1971 | Hattori et al. | 260/94.7 |
| 3,590,026 | 6/1971 | Carlson | 528/500 |
| 3,954,910 | 5/1976 | Kropp et al. | 528/499 |

Primary Examiner—C. A. Henderson

[57] ABSTRACT

A process of removing solvents from polymer solutions is made more efficient by the use of a prestripping operation during which substantially none of the polymer precipitates from solution.

10 Claims, 1 Drawing Figure

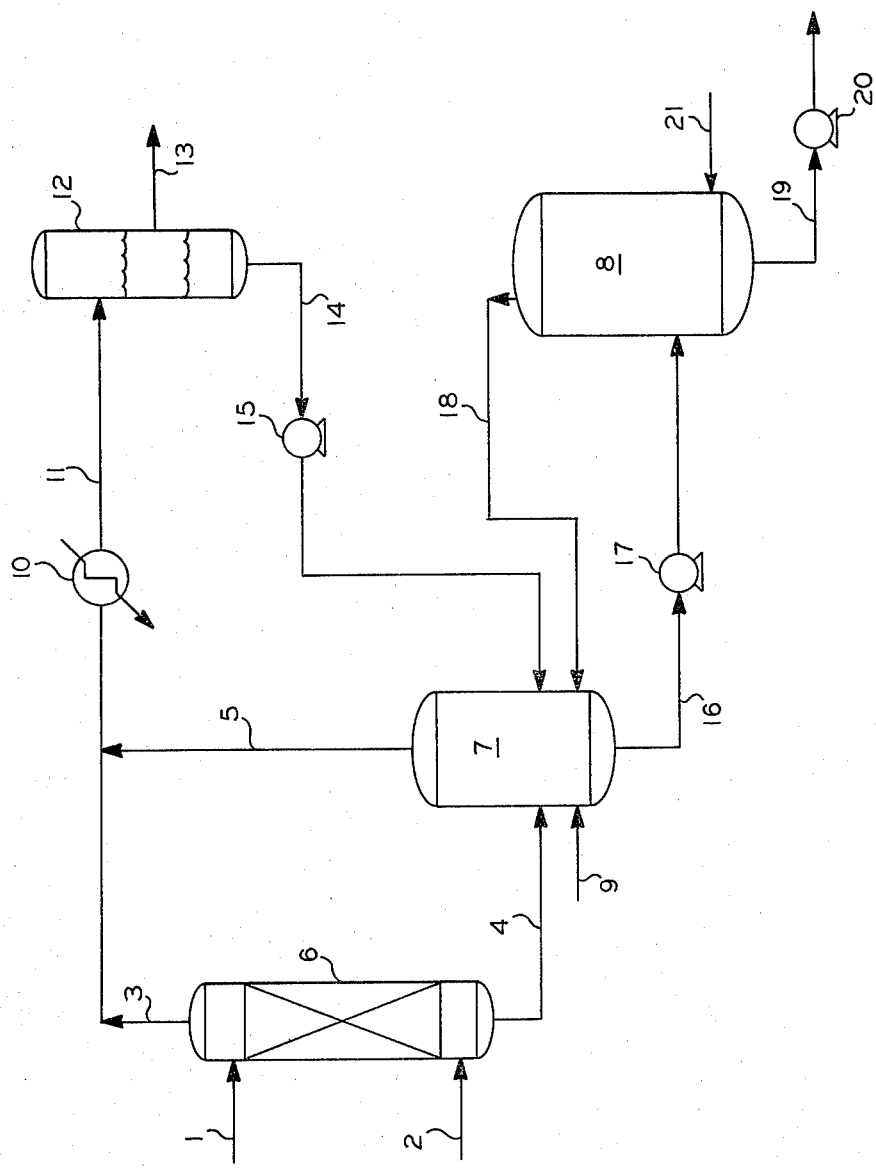

SEPARATION OF POLYMER OF CONJUGATED DIENE FROM A SOLUTION POLYMERIZATION SOLVENT USING PRESTRIPPING STEP

BACKGROUND OF THE INVENTION

In removing solvents from polymers in solution polymerization processes the usual practice is to flash concentrate the reactor effluent to about 12-16 weight percent rubber and then steam strip the concentrated solution, commonly in two stages. The polymer is precipitated as it enters the primary stripping zone and is maintained as an aqueous slurry during steam stripping, the polymer crumb still containing some solvent dissolved in the solid phase.

The principal disadvantage of the steam stripping step is the high steam consumption required to vaporize the solvent, a characteristic of ever increasing concern as the price of energy escalates. For example, a steam stripper operating somewhat above atmospheric pressure and removing cyclohexane solvent requires approximately one pound of steam for each three pounds of solvent in the overhead vapor. This steam is generally condensed against cooling water or ambient air in the subsequent solvent recovery step, a tremendous waste of energy.

THE INVENTION

The invention provides a polymer solution prestripper ahead of the conventional steam stripping step to concentrate the polymer solution beyond the level that can be readily obtained in simple flash concentration. The prestripper uses hot gas, obviating the need for indirect heat exchange to the viscous polymer solution. When processing polymers with high cloud point temperatures, it is preferred to operate the stripper at sufficient pressure so that the boiling point of the polymer solution is always maintained above the cloud point of the solution. As a result, no precipitation of polymer takes place in the prestripping zone and overhead vapor from the prestripper can be combined with stripper overhead effluent. With most elastomeric polymers, however, cloud point is generally not a problem. It is also within the scope of the invention to follow the prestripper with other solvent removal means to effect essentially complete removal of solvent from the polymer.

OBJECTS OF THE INVENTION

In one aspect, the invention provides an economical method of stripping solvents from polymers.

In another aspect, the invention concerns a process for treating polymer solutions which uses less steam than conventional treating processes.

In still another aspect, the invention deals with a process of recovering one or more solvents from rubber solutions with minimal agglomeration of polymer particles during intermediate processing steps.

DESCRIPTION OF THE INVENTION

The prestripper may be any suitable device or combination of devices for contacting a viscous liquid with vapor. A preferred device is a packed column containing packing capable of relatively high liquid loadings such as Raschig rings or Pall rings. Towers using baffles or perforated trays or a series of in-line contactors such as static mixers with a vapor disengaging tank, or other vapor-liquid separator can be used. Mechanically agitated devices such as mixers or even wiped film evaporators may be used if the polymer solution is to be concentrated to a very high viscosity. In any event, a requirement of the prestripping device is that the polymer solution and the vapor (e.g., steam) are brought into sufficiently intimate contact that thermal equilibrium is at least approached if not actually achieved. The stripper must also provide for good vapor-liquid separation.

Although the polymer solution issuing from the prestripper can be relatively concentrated when considered in weight percent (e.g., 20-40), on a molar basis the very high molecular weight polymer is quite dilute. Thus, since the polymer is maintained in solution in the prestripper the solvent exerts essentially its vapor pressure at the high molar solvent concentration prevailing in that zone, and mole fraction of solvent in the prestripper overhead vapor is approximately $$\frac{P_s}{P_s + P_w}$$

where $P_S$ is the vapor pressure of the solvent and $P_W$ is the vapor pressure of water at prestripper temperature. In the primary stripper zone, however, the solvent is dissolved in solid polymer in which case the equilibrium with vapor displays strong negative deviations from Raoult's Law. As a result, as may be noted in the following example, the ratio of solvent to steam is much higher in the prestripper overhead vapor than it is in the primary stripper vapor, generally by a factor of 2 or more. This beneficial relationship means that the amount of energy required to remove a unit of solvent from the polymer in the prestripper is much less than the energy required in the steam strippers.

The invention is applicable to the removal of solvents from solution polymers, particularly from polymers based on conjugated dienes including copolymers of conjugated dienes with other monomers containing an active ethylene group. Conjugated dienes containing 4-8 carbon atoms are preferred. Useful dienes include 1,3-butadiene; isoprene; 2,3-dimethylbutadiene; 2-methoxybutadiene; 1,3-octadiene and the like. Suitable comonomers are vinyl compounds including vinyl substituted arylene compounds containing 8 to 12 carbon atoms. Among the preferred comonomers are styrene, acrylonitrile, methyl acrylate, -methyl styrene, methyl methacrylate, vinyl chloride, methyl vinyl ether, ethylene, propylene, 1-butene, 1-octene and the like. The polymers are prepared in the presence of organic solvents including paraffins, cycloparaffins, aromatics and mixtures of these hydrocarbons which are relatively inert and are liquid under most process conditions. Examples of such solvents include lower molecular weight alkanes such as propane, butane, pentane, hexane, the higher molecular weight paraffins and cycloparaffins such as isooctane, cyclopentane, cyclohexane, methylcyclohexane, and aromatic compounds such as benzene, toluene and the like. Mixtures of polymers and mixtures of solvents can also be treated in accordance with the invention.

Although the type of initiator used for the polymerization is not a critical feature of the invention, suitable initiator systems include those enumerated in U.S. Pat. No. 3,590,026, columns 3 and 4.

From an engineering standpoint, the prestripper is preferably operated under sufficient pressure to permit overhead vapor to enter the steam stripper solvent condenser and the stripper bottoms to enter the subsequent solvent removal step, e.g., steam stripping, without compressing or pumping. This requirement, together with the vapor pressure characteristics of the solvent, will determine the operating temperature of the prestripper.

For a typical butadiene-styrene copolymer in cyclohexane solvent the prestripper will generally operate in the range of 170° to 280° F. (77° to 135° C.) and 19 to 112 psi (131 to 772 kPa). Polymer solution feed concentration will generally be in the range of 10 to 30 weight percent.

Preferably, heat is provided to the prestripper using a direct injection of a hot gas into the lower portion of the prestripper. Useful gases include steam, inert non-condensable gases and superheated solvent vapor.

If a packed column is used for the prestripper, a length/diameter ratio in the range of 1.5–20 is suitable, with the range of 2–10 generally preferred. Normally, the feed will be introduced on top of the packing.

It is generally preferred to use a liquid distributor for the feed to insure good distribution of liquid across the packing. The prestripper can be preceded by one or more flash steps on the reactor effluent. The prestripper can be followed by one or more solvent removal steps.

The bottoms stream from the prestripping operation is a highly concentrated polymer solution and normally water if steam is the stripping media. This stream is passed to the primary solvent removal zone for precipitation of polymer from solution.

Solvent removal may be accomplished in a variety of devices which impart mechanical energy to the polymer which energy is, in turn, degraded to heat. Optionally, the mechanical energy can be supplemented by indirect heat, for example, by supplying a hot fluid such as steam or a hot inert gas. Useful solvent removal devices include steam strippers, devolatilizing extruders, Banbury mixers, expellers, so-called porcupine blenders, paddle-dryers and powder form evaporators. Preferably, a steam stripper is employed. When a steam stripper is used, typical temperatures and pressures in the stripper are 140° to 225° F. (73°–107° C.) and 5 to 25 psia.

Regardless of the solvent removal means employed, it is preferred that the solvent recovery condenser used be shared with the prestripper. In that event, prestripper operating pressure would be sufficiently high so that no pumping or compression of solvent vapor is required.

THE DRAWING

A typical process flow diagram is depicted in the figure in which polymer feed solution 1 is introduced in the upper section of prestripper 6 and live steam 2 is introduced into the lower section thereof. Overhead vapor 3 is a mixture of solvent and steam containing as much as half the solvent in the feed or more. Prestripper bottoms 4, a mixture of concentrated polymer solution and water, passes to primary steam stripper 7 along with outside water 9. Primary stripper overhead vapor 5 may be combined with vapor 3 and condensed in condensor 10, the combined steam 11 passing to phase separator 12 where condensed solvent 13 is removed for recycle to the reactor and condensed water may be returned to the primary steam stripper via line 14 and pump 15. Polymer slurry 16 is pumped by pump 17 to secondary steam stripper 8 from which overhead vapor 18 is returned to the primary steam stripper and polymer slurry 19 is pumped by 20 to further processing. Steam is introduced into secondary stripper 8 via line 21. Overhead vapor 18 from the secondary stripper is injected into the lower section of the primary stripper 7 as the stripping and heating media for stripper 7.

EXAMPLE I (Calculated Example)

A 14 weight percent rubber solution (75% butadiene-25% styrene rubber in cyclohexane solvent) at 145° F. (63° C.) is fed to a packed prestripper column at a rate of 42,860 lb/hr. (18,438 kg/hr.). Steam (250 psig, 415° F.) (1.83 MPa, 213° C.) is introduced near the bottom of the prestripper at a rate of 6,740 lb/hr. (3057 kg/hr.). The prestripper operates at 225° F. (107° C.) and 50 psia (345 kPa). Prestripper overhead vapor comprises 18,860 lb/hr. (8553 kg/hr.) solvent and 2,470 lb/hr. (1120 kg/hr.) steam, corresponding to a solvent/steam weight ratio of 7.64. Prestripper bottoms comprising 6,000 lb/hr. (2721 kg/hr.) rubber in solution, 18,000 lb/hr. (8163 kg/hr.) solvent and 4,270 lb/hr. (1937 kg/hr.) water passes to the primary steam stripper operating at 194° F. (90° C.) and 17 psia (117 kPa). Overhead vapor from the primary steam stripper comprises 18,000 lb/hr. (8163 kg/hr.) solvent and 5,600 lb/hr. (2540 kg/hr.) steam, corresponding to a solvent/steam weight ratio of only 3.22.

It is apparent from the above example that from an energy consumption standpoint the process of the invention, which employs a prestripper is a much more efficient process than the conventional process using the steam stripper alone.

EXAMPLE II (Comparison)

In a similar run without the use of a prestripper, the steam passing to the steam stripper condenser was 11,470 lb/hr. As the following table illustrates, there is a considerable saving in steam using the prestripping operation called for by the instant invention.

| Steam & Water Flows, (lb/hr) Stream No. (FIG.) | Steam Into Column (2) | Steam From Column to Condenser (3) | Water From Column to Stripper (4) | Steam From Stripper to Condenser (5) | Total Steam to Condenser (11) |
|---|---|---|---|---|---|
| Ex. I | 6,740 | 2,470 | 4,270 | 5,600 | 8,070 |
| Ex. II | | | | | 11,470 |
| | | | | Steam saving: | 3,400 lb/hr. |

Various modifications as may become apparent to one of ordinary skill in the art are within the scope of this invention.

I claim:

1. A process of separating a polymer of conjugated diene in solution polymerization solvent from said solvent, said process comprising:
   (1) removing a portion of the solvent from the solution without precipitation of polymer by subjecting said polymer of conjugated diene in solution polymerization solvent to a prestripping operation using hot gas as a stripping agent; and
   (2) subjecting the solution from step (1) to at least one further solvent removal treatment.

2. The process of claim 1 wherein the prestripping operation takes place in a packed or perforated tray column.

3. The process of claim 1 wherein the prestripping operation takes place in a mixer and a vapor-liquid separator.

4. The process of claim 1 wherein the prestripping operation is preceded by a flash concentrating step.

5. The process of claim 1 wherein the solvent removal treatment takes place in a steam stripper.

6. A process of separating a polymer of conjugated diene in solution polymerization solvent from said solvent comprising the steps of:
   (1) introducing polymer solution feed comprising conjugated diene in solution polymerization solvent and steam into a prestripping zone from which a concentrated polymer solution without precipitate is recovered;
   (2) passing the overhead vapor from the prestripping zone, after condensation, to a phase separator zone;
   (3) passing the concentrated polymer solution without precipitate recovered from the prestripping operation of (1) to a solvent removal zone; and
   (4) recovering the polymer-containing effluent from the solvent removal zone.

7. The process of claim 6 wherein the solvent removal zone is a primary steam stripping zone.

8. The process of claim 7 including the additional steps of:
   (5) passing the solution without precipitate recovered from the primary steam stripping zone into a secondary steam stripping zone; and
   (6) recovering a polymer slurry as the product of (5).

9. The process of any of claims 6, 7, or 8 wherein the bottoms from the phase separator are passed to the primary steam stripping zone.

10. The process of any of claims 6, 7, or 8 wherein the overhead vapor from the primary steam stripping zone is mixed with the overhead vapor from the prestripping zone and then passed, after condensation, to a phase separator zone.

* * * * *